US006560667B1

United States Patent
Wolrich et al.

(10) Patent No.: US 6,560,667 B1
(45) Date of Patent: May 6, 2003

(54) HANDLING CONTIGUOUS MEMORY REFERENCES IN A MULTI-QUEUE SYSTEM

(75) Inventors: Gilbert Wolrich, Framingham, MA (US); Debra Bernstein, Sudbury, MA (US); Matthew J. Adiletta, Worc., MA (US); William Wheeler, Southboro, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,112

(22) Filed: Dec. 28, 1999

(51) Int. Cl.[7] .............................................. G06F 13/18
(52) U.S. Cl. ..................... 710/310; 710/39; 710/309; 710/240; 710/40
(58) Field of Search ..................... 709/103; 711/144, 711/120; 712/217; 710/52, 38, 39, 40, 56, 309, 310, 240, 241

(56) References Cited

U.S. PATENT DOCUMENTS

| 5,448,702 | A | * | 9/1995 | Garcia et al. ............... 710/100 |
| 5,699,537 | A | * | 12/1997 | Sharangpani et al. ........ 712/217 |
| 5,890,208 | A | * | 3/1999 | Kwon ......................... 711/112 |
| 5,940,612 | A | * | 8/1999 | Brady et al. ................ 709/103 |
| 6,085,294 | A | * | 7/2000 | Van Doren et al. ......... 711/144 |
| 6,092,127 | A | * | 7/2000 | Tausheck .................... 710/56 |
| 6,160,562 | A | * | 12/2000 | Chin et al. .................. 345/520 |
| 6,201,807 | B1 | * | 3/2001 | Prasanna .................... 370/389 |

* cited by examiner

Primary Examiner—B. James Peikari
(74) Attorney, Agent, or Firm—Fish & Richardson P.C.

(57) ABSTRACT

A controller for a random access memory has control logic, including an arbiter that detects a status of outstanding memory references. The controller selects a memory reference from one of a plurality queues of memory references. The control logic is responsive to a memory reference chaining bit that when set allows for special handling of contiguous memory references, such that the arbiter services a same queue until the chaining bit is cleared.

23 Claims, 10 Drawing Sheets

HANDLING CONTIGUOUS MEMORY REFERENCES IN A MULTI-QUEUE SYSTEM

BACKGROUND

This invention relates to memory systems for parallel processors.

Parallel processing is an efficient form of information processing of concurrent events in a computing process. Parallel processing demands concurrent execution of many programs in a computer, in contrast to sequential processing. In the context of a parallel processor, parallelism involves doing more than one thing at the same time. Unlike a serial paradigm where all tasks are performed sequentially at a single station or a pipelined machine where tasks are performed at specialized stations, with parallel processing, a plurality of stations are provided with each capable of performing all tasks. That is, in general all or a plurality of the stations work simultaneously and independently on the same or common elements of a problem. Certain problems are suitable for solution by applying parallel processing.

Parallel processing can place constraints on memory systems particularly when different devices can write to or read from the same memory system.

SUMMARY

According to an aspect of the present invention, a controller for a random access memory includes control logic, including an arbiter that detects a status of outstanding memory references to select a memory reference from one of a plurality queues of memory references. The control logic is responsive to a memory reference chaining bit that when set allows for special handling of contiguous memory references.

DESCRIPTION

Figure 1:
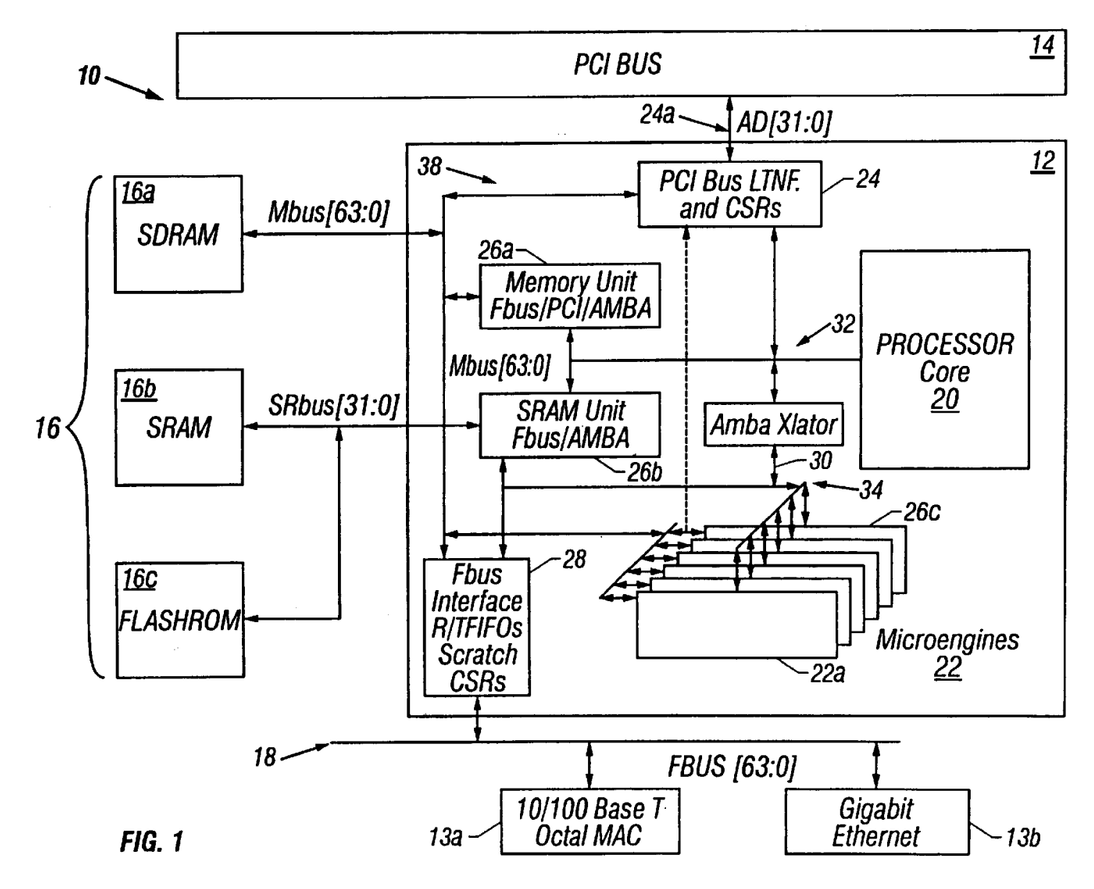
FIG. 1 is a block diagram of a communication system employing a hardware-based multi-threaded processor.
Figure 2A:
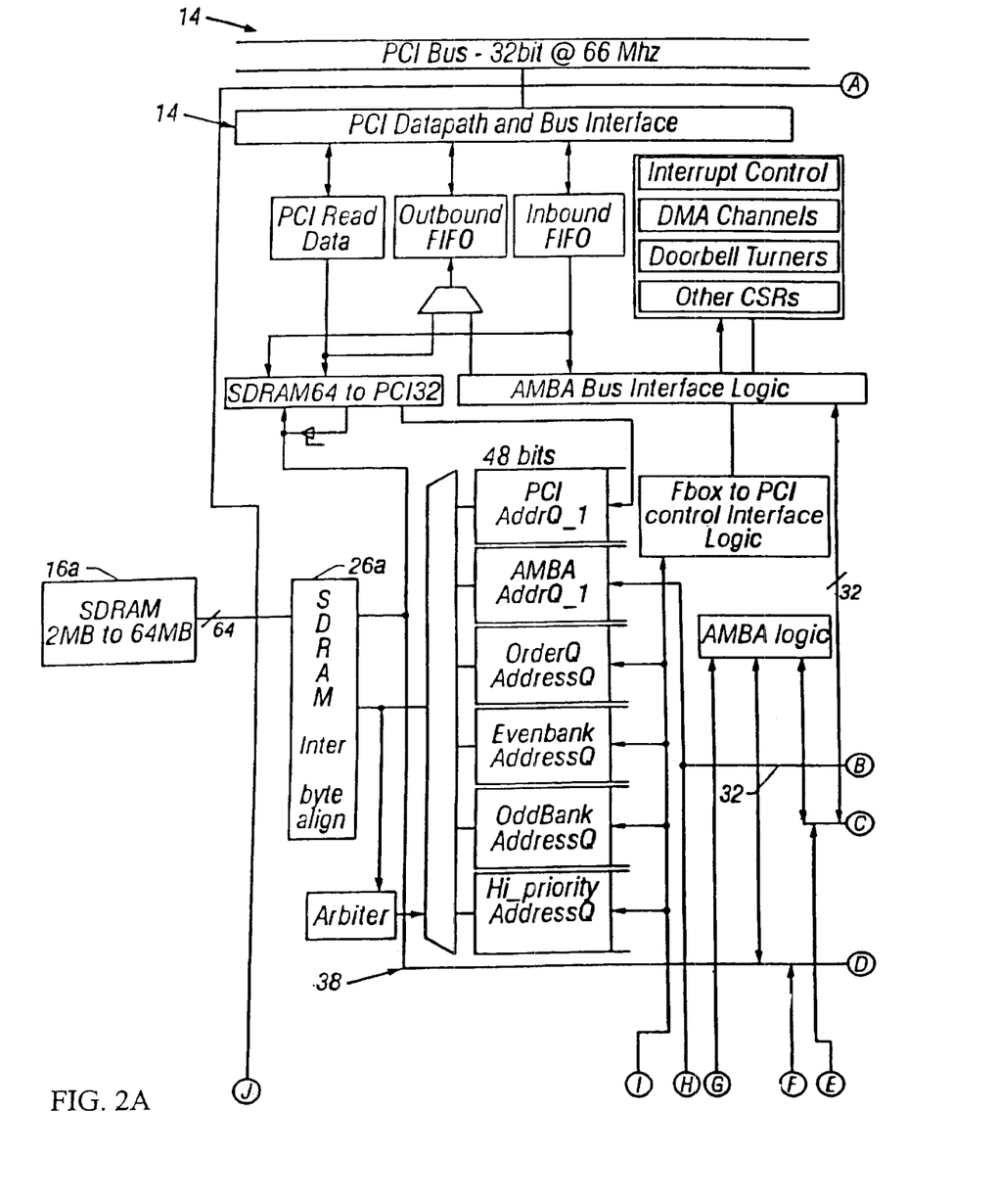
FIGS. 2A, 2B, 2C and 2D, collectively referred to hereinafter as "FIG. 2", are detailed block diagrams of the hardware-based multi-threaded processor of FIG. 1.
Figure 2B:
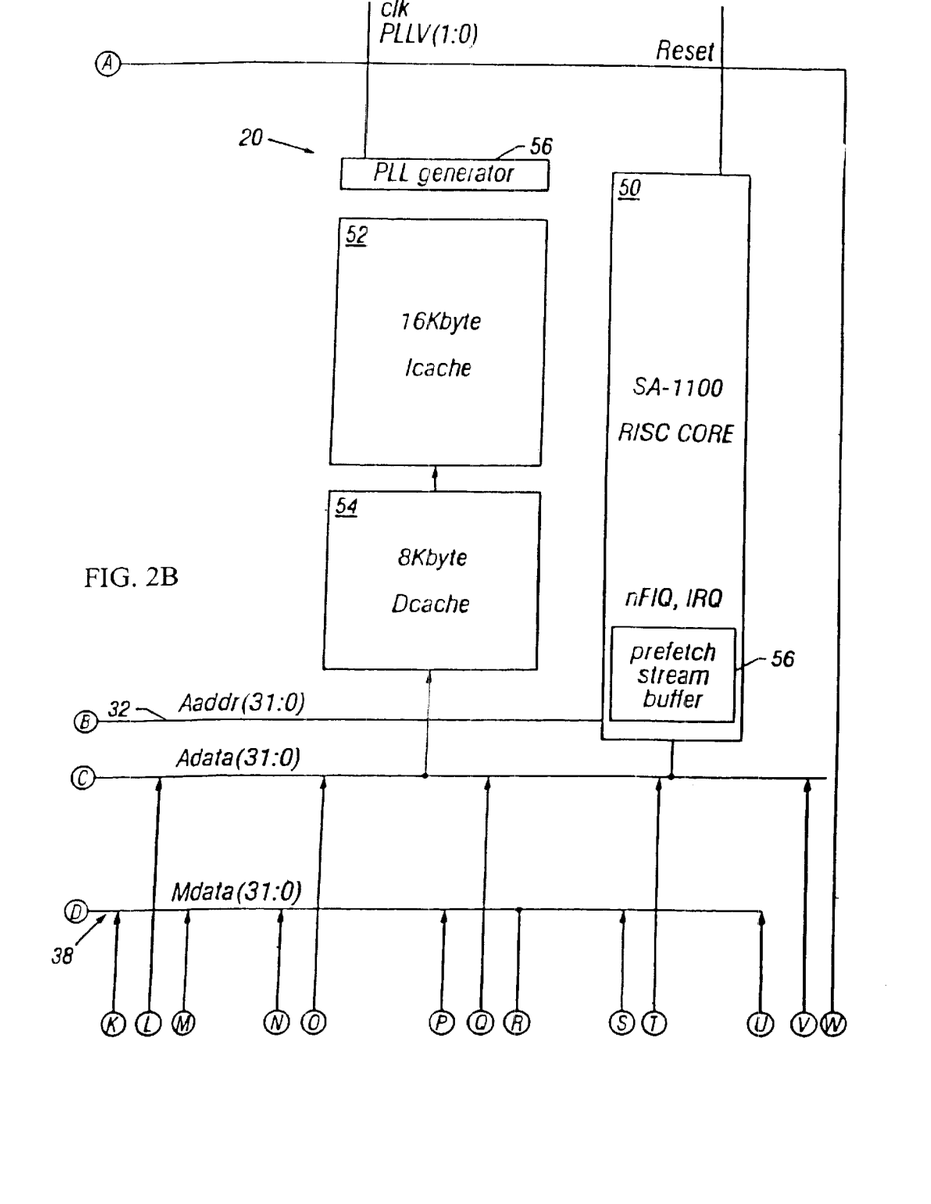
Figure 2C:
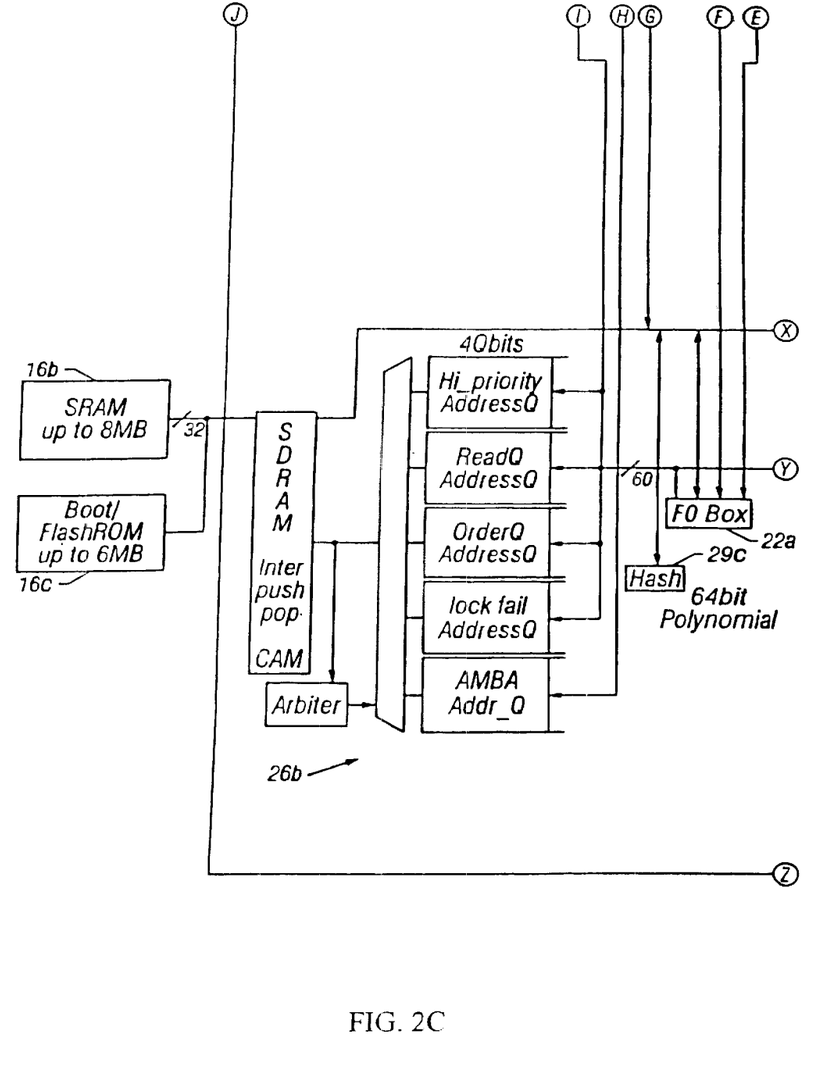
Figure 2D:
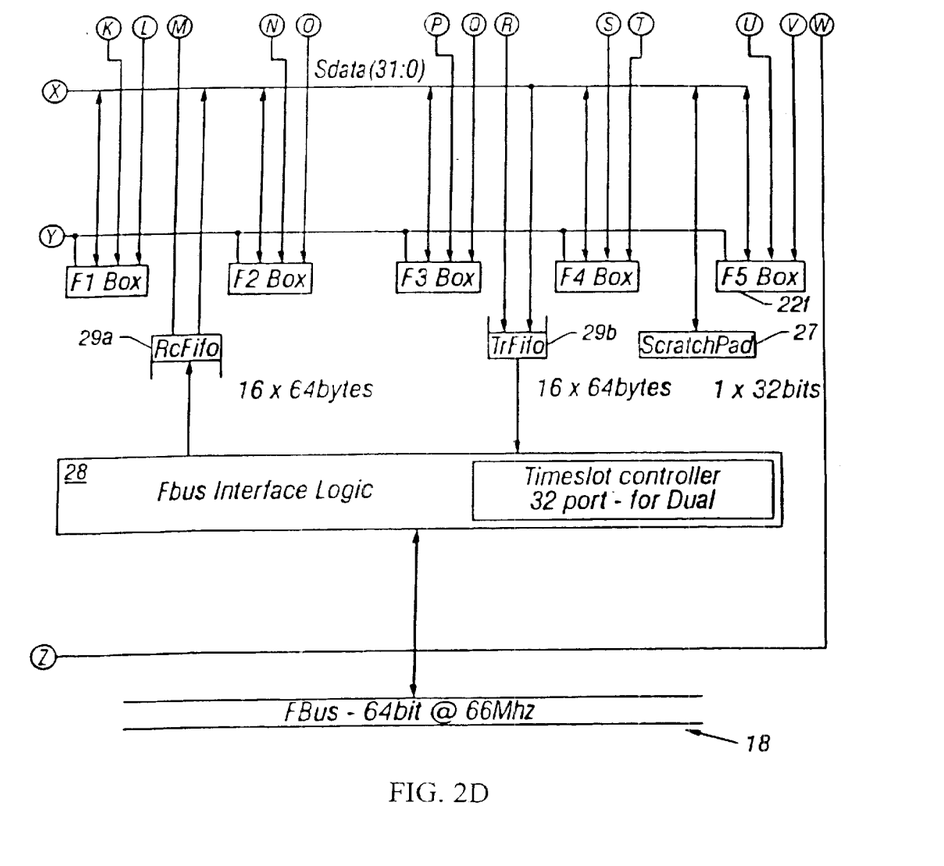

Referring to FIG. 1, a communication system 10 includes a parallel, hardware-based multithreaded processor 12. The hardware-based multithreaded processor 12 is coupled to a bus such as a Peripheral Component Interconnect (PCI) bus 14, a memory system 16 and a second bus 18. The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple microengines 22 each with multiple hardware controlled threads that can be simultaneously active and independently work on a task.

The hardware-based multithreaded processor 12 also includes a central controller 20 that assists in loading microcode control for other resources of the hardware-based multithreaded processor 12 and performs other general purpose computer type functions such as handling protocols, exceptions, extra support for packet processing where the microengines pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system the processor 20 can call functions to operate on microengines 22a–22f. The processor 20 can use any supported operating system preferably a real time operating system. For the core processor implemented as a Strong Arm architecture, operating systems such as, Microsoft NT® real-time, VXWorks® and µCUS, a freeware operating system available over the Internet, can be used.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually operating at any one time.

In one embodiment, there are six microengines 22a–22f, as shown. The microengines 22a–22f have capabilities for processing four hardware threads. The six microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six microengines 22a–22f access either the SDRAM 16a or SRAM 16b based on characteristics of the data. Thus, low latency, low bandwidth data is stored in and fetched from SRAM, whereas higher bandwidth data for which latency is not as important, is stored in and fetched from SDRAM. The microengines 22a–22f can execute memory reference instructions to either the SDRAM controller 26a or SRAM controller 16b.

Advantages of hardware multithreading can be explained by SRAM or SDRAM memory accesses. As an example, an SRAM access requested by a Thread_0, from a microengine will cause the SRAM controller 26b to initiate an access to the SRAM memory 16b. The SRAM controller controls arbitration for the SRAM bus, accesses the SRAM 16b, fetches the data from the SRAM 16b, and returns data to a requesting microengine 22a–22b. During an SRAM access, if the microengine e.g., 22a had only a single thread that could operate, that microengine would be dormant until data was returned from the SRAM. By employing hardware context swapping within each of the microengines 22a–22f, the hardware context swapping enables other contexts with unique program counters to execute in that same microengine. Thus, another thread e.g., Thread_1 can function while the first thread, e.g., Thread_0, is awaiting the read data to return. During execution, Thread_1 may access the SDRAM memory 16a. While Thread_1 operates on the SDRAM unit, and Thread_0 is operating on the SRAM unit, a new thread, e.g., Thread_2 can now operate in the microengine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one microengine 22a and have one more thread available to process more work in the data path.

The hardware context swapping also synchronizes completion of tasks. For example, two threads could hit the same shared resource e.g., SRAM. Each one of these separate functional units, e.g., the FBUS interface 28, the SRAM controller 26a, and the SDRAM controller 26b, when they complete a requested task from one of the microengine thread contexts reports back a flag signaling completion of an operation. When the flag is received by the microengine, the microengine can determine which thread to turn on.

One example of an application for the hardware-based multithreaded processor 12 is as a network processor. As a network processor, the hardware-based multithreaded processor 12 interfaces to network devices such as a media access controller device e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. Communication system 10 functioning in a networking application could receive a plurality of network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, i.e., RAID disk storage. A further use is as a matching engine. In the securities industry for example, the advent of electronic trading requires the use of electronic matching engines to match orders between buyers and sellers. These and other parallel types of tasks can be accomplished on the system 10.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, used to interface to Media Access Controller (MAC) devices.

The processor 12 includes a second interface e.g., a PCI bus interface 24 that couples other system components that reside on the PCI 14 bus to the processor 12. The PCI bus interface 24, provides a high speed data path 24a to memory 16 e.g., the SDRAM memory 16a. Through that path data can be moved quickly from the SDRAM 16a through the PCI bus 14, via direct memory access (DMA) transfers. The hardware based multithreaded processor 12 supports image transfers. The hardware based multithreaded processor 12 can employ a plurality of DMA channels so if one target of a DMA transfer is busy, another one of the DMA channels can take over the PCI bus to deliver information to another target to maintain high processor 12 efficiency. Additionally, the PCI bus interface 24 supports target and master operations. Target operations are operations where slave devices on bus 14 access SDRAMs through reads and writes that are serviced as a slave to target operation. In master operations, the processor core 20 sends data directly to or receives data directly from the PCI interface 24.

Each of the functional units are coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controller 26a, 26c and to an ASB translator 30 described below. The ASB bus is a subset of the so called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Referring to FIG. 2, each of the microengines 22a–22f includes an arbiter that examines flags to determine the available threads to be operated upon. Any thread from any of the microengines 22a–22f can access the SDRAM controller 26a, SDRAM controller 26b or FBUS interface 28. The memory controllers 26a and 26b each include a plurality of queues to store outstanding memory reference requests. The queues either maintain order of memory references or arrange memory references to optimize memory bandwidth. For example, if a thread_0 has no dependencies or relationship to a thread_1, there is no reason that thread 1 and 0 cannot complete their memory references to the SRAM unit out of order. The microengines 22a–22f issue memory reference requests to the memory controllers 26a and 26b. The microengines 22a–22f flood the memory subsystems 26a and 26b with enough memory reference operations such that the memory subsystems 26a and 26b become the bottleneck for processor 12 operation.

If the memory subsystem 16 is flooded with memory requests that are independent in nature, the processor 12 can perform memory reference sorting. Memory reference sorting improves achievable memory bandwidth. Memory reference sorting, as described below, reduces dead time or a bubble that occurs with accesses to SRAM. With memory references to SRAM, switching current direction on signal lines between reads and writes produces a bubble or a dead time waiting for current to settle on conductors coupling the SRAM 16b to the SRAM controller 26b.

That is, the drivers that drive current on the bus need to settle out prior to changing states. Thus, repetitive cycles of a read followed by a write can degrade peak bandwidth. Memory reference sorting allows the processor 12 to organize references to memory such that long strings of reads can be followed by long strings of writes. This can be used to minimize dead time in the pipeline to effectively achieve closer to maximum available bandwidth. Reference sorting helps maintain parallel hardware context threads.

SDRAM memory reference sorting allows hiding of precharges from one bank to another bank. Specifically, if the SDRAM memory system 16a is organized into an odd bank and an even bank, while the processor is operating on the odd bank, the memory controller 26a can start precharging the even bank. Precharging is possible if memory references alternate between odd and even banks. By ordering memory references to alternate accesses to opposite banks, the processor 12 takes maximal advantage of SDRAM bandwidth. Additionally, other optimizations can be used. For example, merging optimizations where operations that can be merged, are merged prior to memory access, open page optimizations where by examining addresses an opened page of memory is not reopened, memory chaining, as will be described below, and refreshing mechanisms, can be employed.

The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a microprogrammable source/destination/protocol hashed lookup (used for address smoothing) in SRAM. If the hash does not successfully resolve, the packet header is sent to the processor core 20 for additional processing. The FBUS interface 28 supports the following internal data transactions:

| FBUS unit | (Shared bus SRAM) | to/from microengine. |
|---|---|---|
| FBUS unit | (via private bus) | writes from SDRAM Unit. |
| FBUS unit | (via Mbus) | Reads to SDRAM. |

The FBUS 18 is a standard industry bus and includes a data bus, e.g., 64 bits wide and sideband control for address and read/write control. The FBUS interface 28 provides the ability to input large amounts of data using a series of input and output FIFO's 29a–29b. From the FIFOs 29a–29b, the microengines 22a–22f fetch data from or command the SDRAM controller 26a to move data from a receive FIFO in which data has come from a device on bus 18, into the FBUS interface 28. The data can be sent through memory controller 26a to SDRAM memory 16a, via a direct memory access. Similarly, the microengines can move data from the SDRAM 26a to interface 28, out to FBUS 18, via the FBUS interface 28.

Data functions are distributed amongst the microengines. Connectivity to the SRAM 26a, SDRAM 26b and FBUS 28 is via command requests. A command request can be a memory request or a FBUS request. For example, a command request can move data from a register located in a microengine 22a to a shared resource, e.g., an SDRAM location, SRAM location, flash memory or some MAC address. The commands are sent out to each of the functional units and the shared resources. However, the shared resources do not need to maintain local buffering of the data. Rather, the shared resources access distributed data located inside of the microengines. This enables microengines 22a–22f, to have local access to data rather than arbitrating for access on a bus and risk contention for the bus. With this feature, there is a 0 cycle stall for waiting for data internal to the microengines 22a–22f.

The data buses, e.g., ASB bus 30, SRAM bus 34 and SDRAM bus 38 coupling these shared resources, e.g., memory controllers 26a and 26b are of sufficient bandwidth such that there are no internal bottlenecks. Thus, in order to avoid bottlenecks, the processor 12 has an bandwidth requirement where each of the functional units is provided with at least twice the maximum bandwidth of the internal buses. As an example, the SDRAM can run a 64 bit wide bus at 83 MHz. The SRAM data bus could have separate read and write buses, e.g., could be a read bus of 32 bits wide running at 166 MHz and a write bus of 32 bits wide at 166 MHz. That is, in essence, 64 bits running at 166 MHz which is effectively twice the bandwidth of the SDRAM.

The core processor 20 also can access the shared resources. The core processor 20 has a direct communication to the SDRAM controller 26a to the bus interface 24 and to SRAM controller 26b via bus 32. However, to access the microengines 22a–22f and transfer registers located at any of the microengines 22a–22f, the core processor 20 access the microengines 22a–22f via the ASB Translator 30 over bus 34. The ASB translator 30 can physically reside in the FBUS interface 28, but logically is distinct. The ASB Translator 30 performs an address translation between FBUS microengine transfer register locations and core processor addresses (i.e., ASB bus) so that the core processor 20 can access registers belonging to the microengines 22a–22c.

Figure 3A:
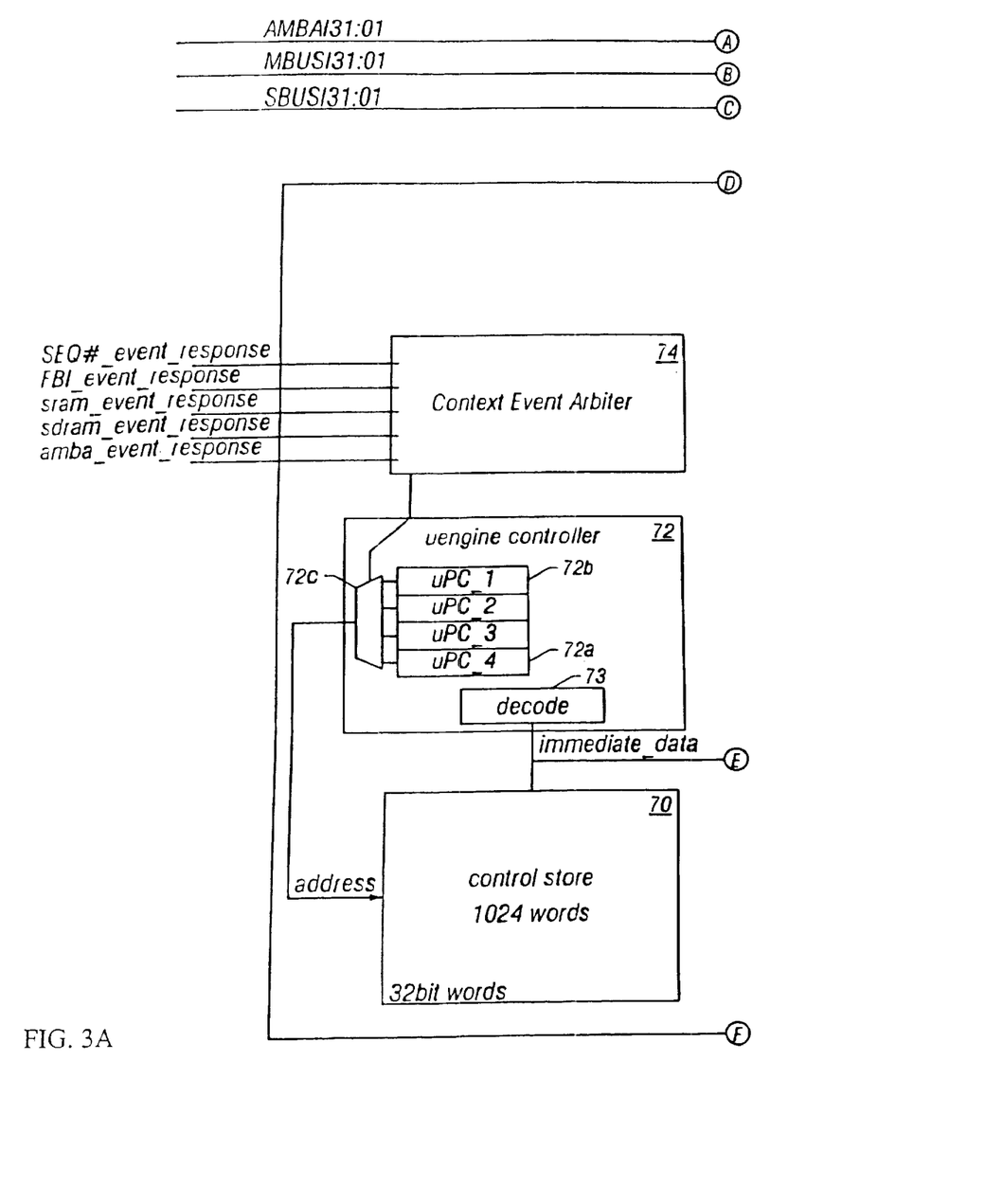
FIGS. 3A and 3B, collectively referred to hereinafter as "FIG. 3", are block diagrams of a microengine functional unit employed in the hardware-based multi-threaded processor of FIG. 1.
Figure 3B:
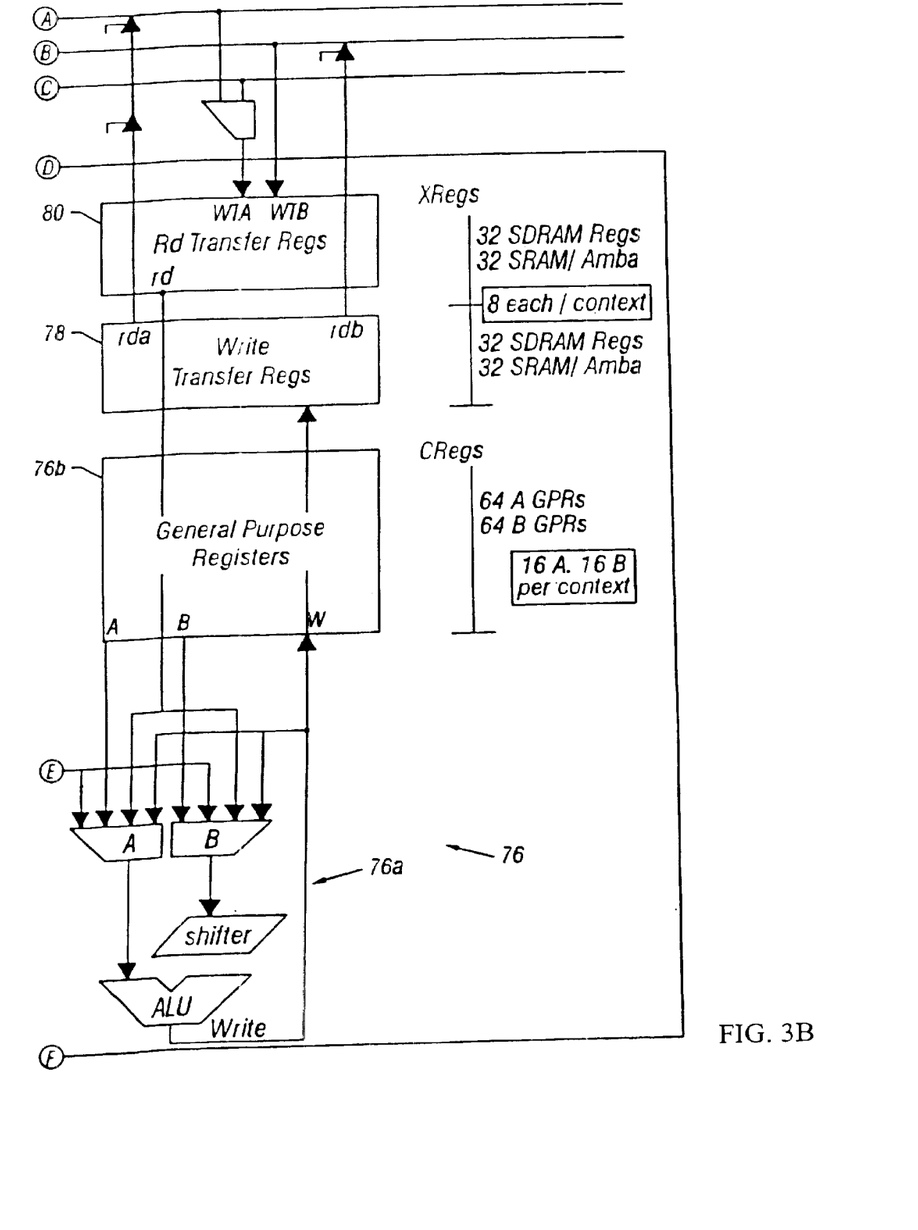

Referring to FIG. 3, an exemplary one of the microengines 22a–22f, e.g., microengine 22f is shown. The microengine includes a control store 70 which, in one implementation, includes a RAM of here 1,024 words of 32 bit. The RAM stores a microprogram. The microprogram is loadable by the core processor 20. The microengine 22f also includes controller logic 72. The controller logic includes an instruction decoder 73 and program counter (PC) units 72a–72d. The four micro program counters 72a–72d are maintained in hardware. The microengine 22f also includes context event switching logic 74. Context event logic 74 receives messages (e.g., SEQ_#_EVENT_RESPONSE: FBI_EVENT_RESPONSE; SRAM_EVENT_RESPONSE; SDRAM_EVENT_RESPONSE; and ASB_EVENT_RESPONSE) from each one of the shared resources, e.g., SRAM 26a, SDRAM 26b, or processor core 20, control and status registers, and so forth. These messages provide information on whether a requested function has completed. Based on whether or not a function requested by a thread has completed and signaled completion, the thread needs to wait for that completion signal, and if the thread is enabled to operate, then the thread is placed on an available thread list (not shown). The microengine 22f can have a maximum of e.g., 4 threads available.

In addition to event signals that are local to an executing thread, the microengines 22 employ signaling states that are global. With signaling states, an executing thread can broadcast a signal state to all microengines 22. Receive Request Available signal, Any and all threads in the microengines can branch on these signaling states. These signaling states can be used to determine availability of a resource or whether a resource is due for servicing.

The context event logic 74 has arbitration for the four (4) threads. In one embodiment, the arbitration is a round robin mechanism. Other techniques could be used including priority queuing or weighted fair queuing. The microengine 22f also includes an execution box (EBOX) data path 76 that includes an arithmetic logic unit 76a and general purpose register set 76b. The arithmetic logic unit 76a performs arithmetic and logical functions as well as shift functions. The registers set 76b has a relatively large number of general purpose registers. In this implementation there are 64 general purpose registers in a first bank, Bank A and 64 in a second band, Bank B. The general purpose registers are windowed as will be described so that they are relatively and absolutely addressable.

The microengine 22f also includes a write transfer register stack 78 and a read transfer stack 80. These registers are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the thread that the data is available or has been sent. Both transfer register banks 78 and 80 are connected to the execution box (EBOX) 76 through a data path. In one implementation, the read transfer register has 64 registers and the write transfer register has 64 registers.

Figure 4A:
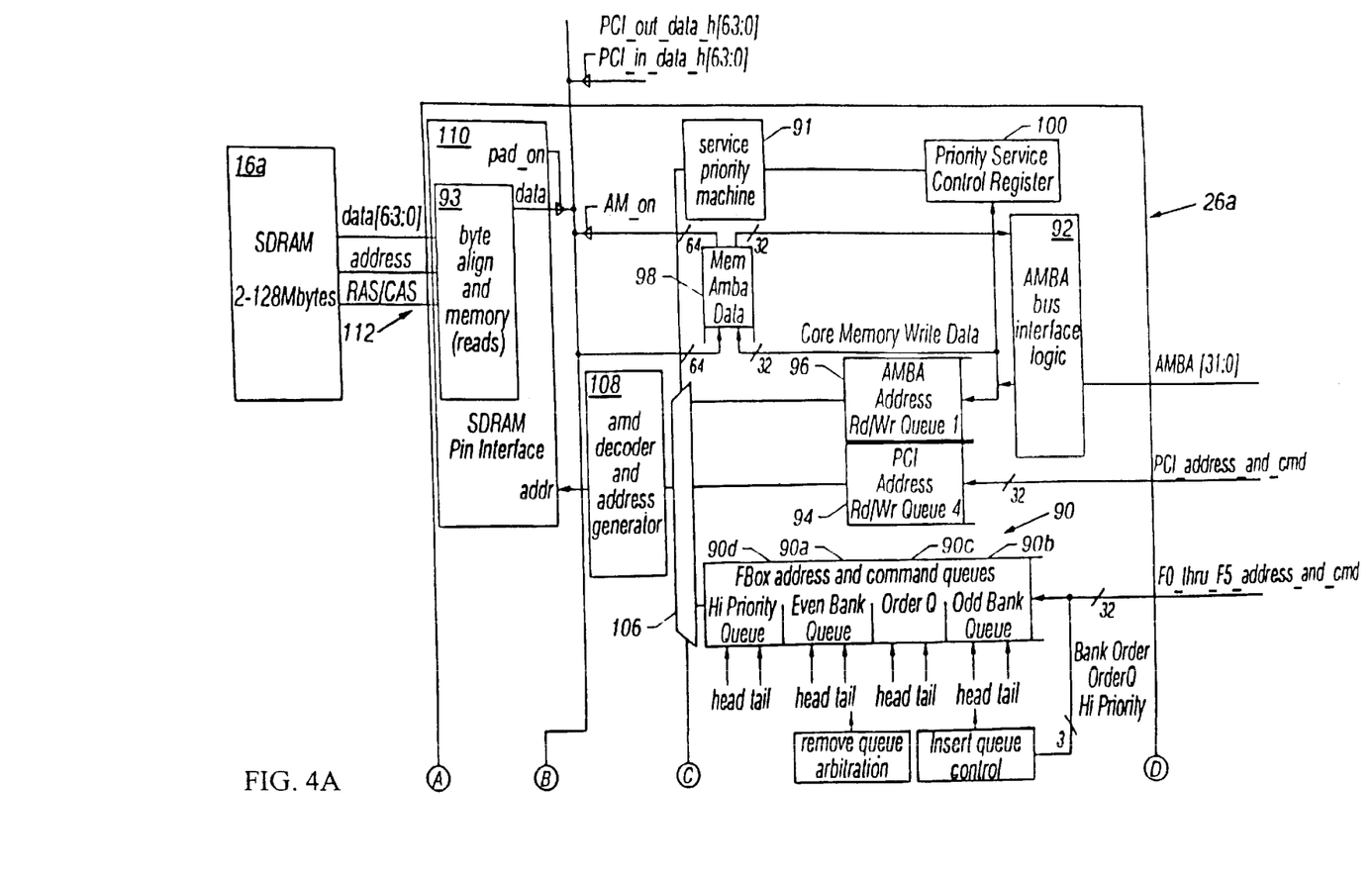
FIGS. 4A and 4B, collectively referred to hereinafter as "FIG. 4", are block diagrams of a memory controller for enhanced bandwidth operation used in the hardware-based multi-threaded processor of FIG. 1.
Figure 4B:
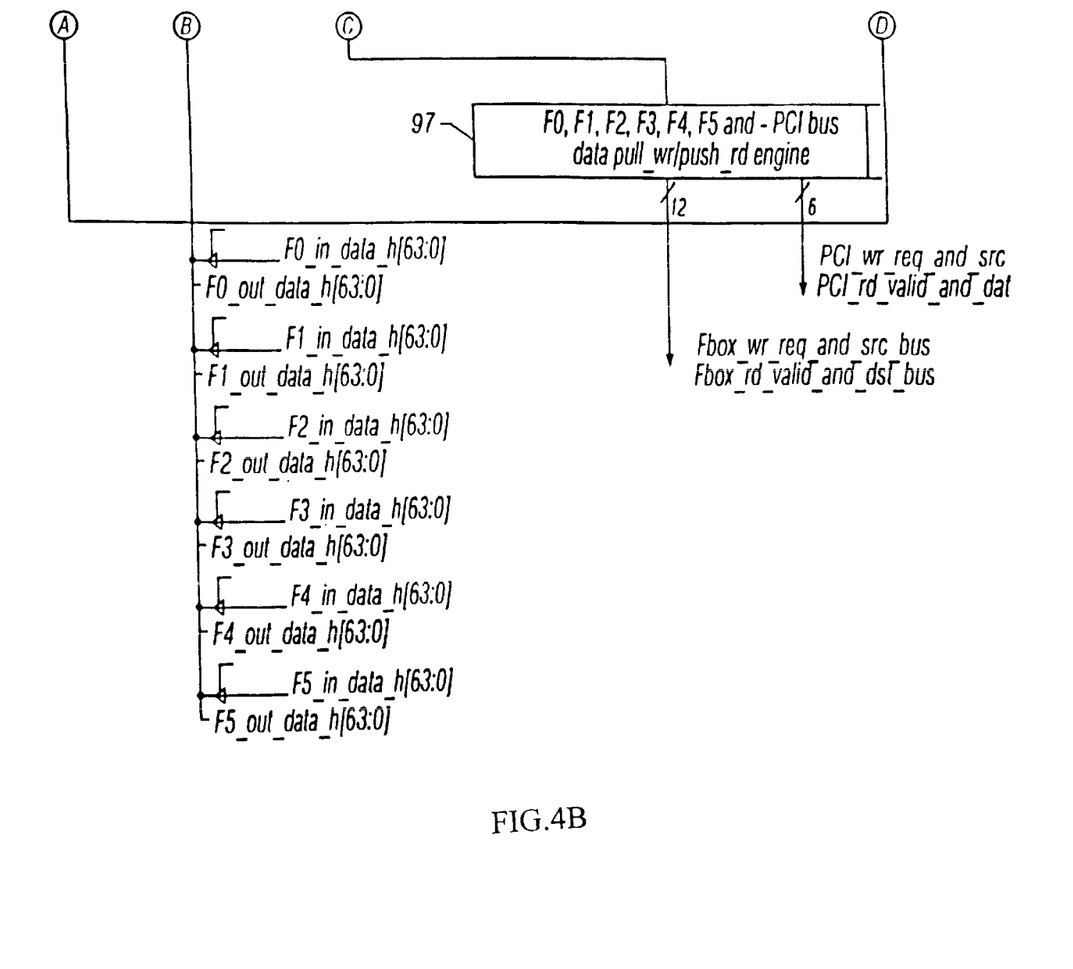

Referring to FIG. 4, the SDRAM memory controller 26a includes memory reference queues 90 where memory reference requests arrive from the various microengines 22a–22f. The memory controller 26a includes an arbiter (service priority machine) 91 that selects the next the microengine reference requests to issue to any of the functional units. Given that one of the microengines is providing a reference request, the reference request will come through the address and command queue 90, inside the SDRAM controller 26a. If the reference request has an "optimized MEM bit" set, the incoming reference request will be sorted into either the even bank queue 90a or the odd bank queue 90b. If the memory reference request does not have a memory optimization bit set, the default will be to go into an order queue 90c. The SDRAM controller 26 is a resource which is shared among the FBUS interface 28, the core processor 20 and the PCI interface 24. The SDRAM controller 26 also maintains a state machine for performing READ-MODIFY-Write atomic operations. The SDRAM controller 26 also performs byte alignment for requests of data from SDRAM.

The order queue 90c maintains the order of reference requests from the microengines. With a series of odd and even banks references it may be required that a signal is returned only upon completion of a sequence of memory references to both the odd and even banks. If the microengine 22f sorts the memory references into odd bank and even bank references and one of the banks, e.g., the even bank is drained of memory references before the odd bank but the signal is asserted on the last even reference, the memory controller 26a could conceivably signal back to a microengine that the memory request had completed, even though the odd bank reference had not been serviced. This occurrence could cause a coherency problem. The situation is avoided by providing the order queue 90c allowing a microengine to have multiple memory references outstanding of which only its last memory reference needs to signal a completion.

The SDRAM controller 26a also includes a high priority queue 90d. In the high priority queue 90d, an incoming memory reference from one of the microengines goes directly to the high priority queue and is operated upon at a higher priority than other memory references in the other queues. All of these queues, the even bank queue 90a, the odd bank queue 90b, the order queue 90c and the high priority queue, are implemented in a single RAM structure that is logically segmented into four different windows, each window having its own head and tail pointer. Since filling and draining operations are only a single input and a single output, they can be placed into the same RAM structure to increase density of the RAM structure.

The SDRAM controller 26a also includes core bus interface logic i.e., ASB bus 92. The ASB bus interface logic 92 interfaces the core processor 20 to the SDRAM controller 26a. The ASB bus is a bus that includes a 32 bit data path and a 28 bit address path. The data is accessed to and from memory through MEM ASB data device 98, e.g., a buffer. MEM ASB data device 98 is a queue for write data. If there is incoming data from the core processor 20 via ASB interface 92, the data can be stored into the MEM ASB device 98 and subsequently removed from MEM ASB device 98 through the SDRAM interface 110 to SDRAM memory 16a. Although not shown, the same queue structure can be provided for read operations. The SDRAM controller 26a also includes an engine 97 to pull data from the microengines and PCI bus.

Additional queues include the PCI address queue 94 and ASB read/write queue 96 that maintain a number of requests. The memory requests are sent to SDRAM interface 110 via multiplexer 106. The multiplexer 106 is controlled by the SDRAM arbiter (service priority machine) 91 which detects the fullness of each of the queues and the status of the requests and from that decides priority based on a programmable value stored in a priority service control register 100.

Once control to the multiplexer 106 selects a memory reference request, the memory reference request, is sent to a decoder 108 where it is decoded and an address is generated. The decoded address is sent to the SDRAM interface 110 where it is decomposed into row and column address strobes to access the SDRAM 16a and write or read data over data lines 16a sending data to bus 112. In one implementation, bus 112 is actually two separate buses instead of a single bus. The separate buses would include a read bus coupling the distributed microengines 22a–22f and a write bus coupling the distributed microengines 22a–22f.

A feature of the SDRAM controller 26a is that when a memory reference is stored in the queues 90, in addition to the optimized MEM bit that can be set, there is a memory reference chaining bit ("chain_ref" in the exemplary memory reference instruction format below). The memory reference chaining bit, when set, allows for special handling of contiguous memory references. As previously mentioned, the arbiter (service priority machine) 91 controls which microengine will be selected to provide memory reference requests over the commander bus to queue 90 (FIG. 4). Assertion of the memory reference chaining bit causes the arbiter (service priority machine) 91 to select the functional unit which previously requested that bus.

Contiguous memory references will be received in queue 90 when the memory reference chaining bit is set. Those contiguous references will typically be stored in the order queue 90c because the contiguous memory references are multiple memory references from a single thread. In order to provide synchronization, the memory controller 26a signals at the end of the chained memory references when done. However, in an optimized memory chaining, (e.g., when optimized MEM bit and memory reference chaining bit are both set) the memory references could go into different banks and potentially complete on one of the banks issuing the signal "done" before the other bank was fully drained, thus destroying coherency. In this situation, the memory reference chaining bit is used by the controller 110 to maintain the memory references from the current queue.

Since SDRAM references can originate from many sources, there is a low probability of the next SDRAM reference to a particular bank being to an open row. The SDRAM chained reference bit can be used to signal the controller 26a that the present bank is to remain open and that the next SDRAM reference should be taken from the same queue as the presently executing write operation. Thus the SDRAM controller policy is to always close the present row after a write command unless the memory reference chaining bit is set.

Figure 5:
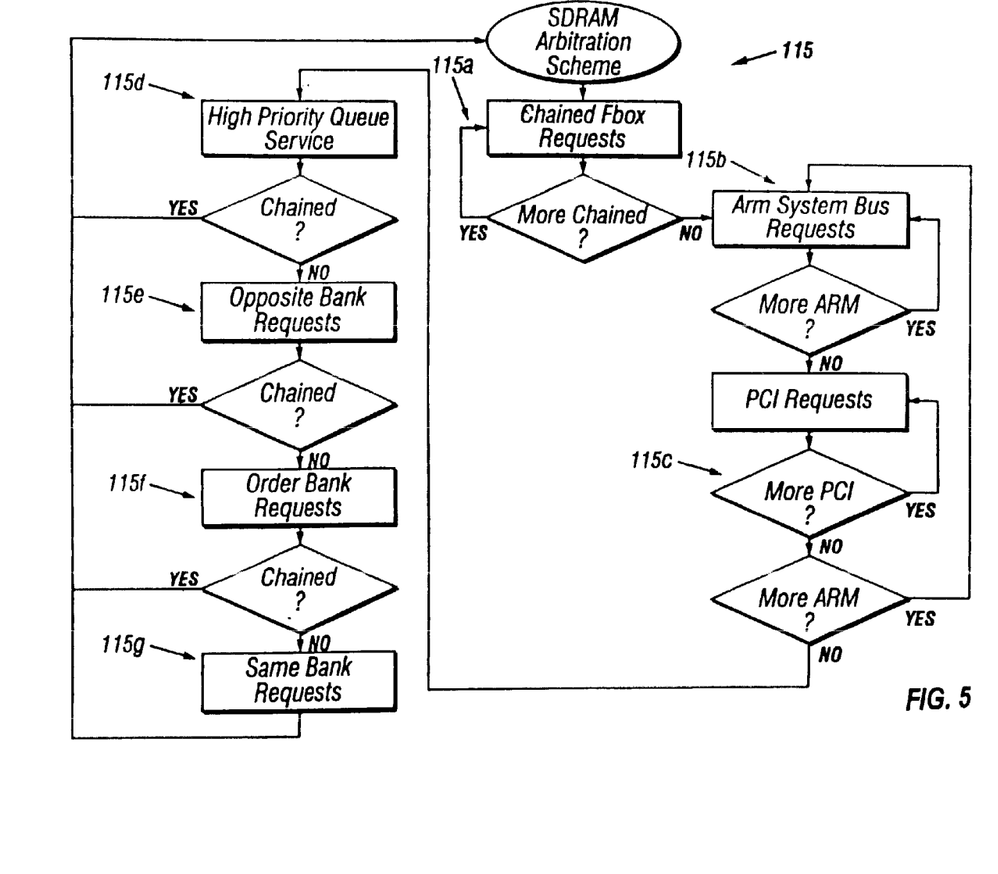
FIG. 5 is a flow chart that represents an arbitration policy in an SDRAM controller of FIG. 4.

Referring to FIG. 5, a flow representation of the arbitration policy in the SDRAM controller 26a is shown. The arbitration policy favors chained microengine memory requests. The process 115 starts by examining for chained microengine memory reference requests 115a. The process 115 stays at the chained requests until the memory reference chaining bit is cleared. The process examines ASB bus requests 115b followed by PCI bus requests 115c, High Priority Queue Service 115d, Opposite Bank Request 115e, Order Queue Requests 115f, and Same Bank Requests 115g. Chained request are serviced completely, whereas services 115b–115d are serviced in round robin order. Only when services 115a–115d are fully drained does the process handle services 115e–115g. Chained microengine memory reference requests are when the previous SDRAM memory request has the memory reference chaining bit set. When the memory reference chaining bit is set then the arbiter (service priority machine) 91 simply services the same queue again, until the memory reference chaining bit is cleared. The ASB is higher priority than PCI due to the severe performance penalty imposed on the Strong arm core when the ASB is in wait state. PCI has higher priority than the microengines due to the latency requirements of PCI. However with other buses, the arbitration priority could be different.

The memory reference chaining bit can also be used when an instruction thread attempts to perform consecutive byte-aligned reads, from different memory locations. For example, a byte aligned read can be used to load data into a transmit FIFO. Byte aligned reads are used to form 64-byte transmit FIFO entries that are quad-word aligned. The entries in the SDRAM may not be quad word aligned. The SDRAM controller reads the first memory location, and shifts the read contents N bytes to align the first byte. The SDRAM controller reads the second location and concatenates (8-N) bytes from the second memory location to form the first 64-bit transmit FIFO entry. The remaining N bytes that were read from the second memory location are shifted and combined with the first 8-N bytes of the third location to form a second 64-bit transmit FIFO entry. The remaining N bytes from the third location are combined with the first 8-N bytes from a fourth location to produce the third byte-aligned transmit FIFO entry, and so forth.

If a new memory command is required for the next memory reference destined for the same transmit FIFO entry, the assertion of the memory reference chaining bit can link the first memory location of the subsequent memory read command with the remaining bytes of the previous SDRAM read command.

The arbiter (service priority machine) 91 enables command references from the six microengines to the FBUS, SRAM, PCI, and SDRAM controllers. When an SDRAM command with the memory reference chaining bit set is sent from a microengine, the arbiter (service priority machine) 91 will only grant SDRAM requests from that same microengine until a command without the memory reference chaining bit is sent to the SDRAM controller ending the chained sequence.

An exemplary format for a memory reference instruction that shows implementation of the memory chaining bit as an optional token called "chain_ref" is shown below:

sdram [sdram_cmd, $$sdram_xfer_reg, source_op1, source_op2, ref_count], optional_token The sdram_cmd field specifies an operation to perform on the SDRAM 16a including a read from SDRAM to an SDRAM transfer register, a write to SDRAM 16a from an SDRAM transfer register or reads from a receive FIFO 29a (FIG. 2) to SDRAM 16a and writes to a transmit FIFO 29b (FIG. 2) from SDRAM 16a.

The $$sdram_xfer_reg field specifies the register at the beginning of a contiguous set of registers that receives or supplies SDRAM data on a read or write operation, respectively.

The source_op1/source_op2 field specifies context-relative registers or 5-bit zero filled immediate data ranging from +31 to 0. These operands are added together to form a SDRAM address.

The ref_count field specifies the number of contiguous SDRAM quadwords to be referenced.

The memory reference instruction also has optional token fields that can take on several states including:

sig_done When the reference completes, signal the corresponding microengine/thread pair that is sourcing or sinking the memory data. Not used with ctx_swap or defer.

ctx_swap When the memory reference is issued, this token has the microengine swap out the current thread executing to let another thread execute. Not used with chain_ref and sig_done.

chain_ref The memory chaining bit causes the memory controller to process the next SDRAM reference from this microengine/thread pair immediately following the current reference as discussed above. Generally, this token is not used with ctx_swap or defer. Once a memory chained reference is started, branch instructions are not executed by a microengine/thread pair until the chain is complete.

defer Used with the ctx_swap option. Specifies that one instruction will be executed after this reference before the context is swapped. Not used with chain_ref or sig_done.

ordered Places the SDRAM memory reference into the ordered queue 90c. The ordered queue 90c preserves the order of execution of references that use the ordered optional token. Not used with optimize_mem or priority. If neither priority nor optimize_mem is specified, the default value is ordered.

priority Places the SDRAM reference into the priority queue 90d. The priority queue 90d gives higher priority to this memory reference over other SDRAM references. Not used with ordered or optimize_mem.

optimize_mem Optimizes memory bandwidth by automatically placing the SDRAM reference into either the Odd or Even queues 90a, 90b. The Odd or Even queues 90a, 90b are selected according to whether the address references data in the odd or even SDRAM bank. This may result in the references being executed in an order different from that in which they were issued. Not used with ordered or priority.

indirect_ref Indicates that overriding qualifiers or additional qualifiers are associated with this reference. These qualifiers are output by the ALU 76 during the previous microword. The format of the qualifier depends on the SDRAM command.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A controller for a random access memory comprises:
control logic, including an arbiter that detects a status of outstanding memory references to select a memory reference from one of a plurality of queues of memory references, said control logic responsive to a memory reference chaining bit that when set allows for special handling of contiguous memory references, the special handling allows the arbiter to service a same queue until the memory reference chaining bit is cleared.

2. The controller of claim 1 wherein consecutive memory references from a thread that has the memory reference chaining bit set, are used to form continuous byte aligned read blocks from discontinuous memory buffers.

3. The controller of claim 1 wherein consecutive memory references from a thread that has the memory reference chaining bit set, are used to optimize performance when consecutive data writes are to the same SDRAM page.

4. The controller of claim 1 wherein assertion of the memory reference chaining bit causes the arbiter to select a functional unit that previously requested access to a memory system.

5. The controller of claim 1, further comprising:
an address and command queue that holds memory references from a plurality of micro control functional units;
a first read/write queue that holds memory reference from a computer bus;
a second read/write queue that holds memory references from a core processor; and wherein the address and command queue comprises:
a high priority queue that holds memory references from high priority tasks.

6. The controller of claim 5, wherein the control logic is responsive to an optimized memory bit and the memory reference chaining bit, and wherein assertion of the memory reference chaining bit causes the arbiter to maintain the memory references from a current queue.

7. The controller of claim 5 wherein when the memory reference chaining bit is set, the arbiter continues to service memory requests from the same queue until the memory reference chaining bit is cleared.

8. The controller of claim 1 wherein the arbiter has an arbitration policy that favors chained microengine memory references.

9. The controller of claim 8 wherein the arbiter has an arbitration policy that services chained requests until the memory reference chaining bit is cleared.

10. The controller of claim 1 wherein the arbiter has an arbitration policy that starts by examining for chained microengine memory reference requests.

11. The controller of claim 1 wherein the arbitration policy enables chained memory requests to be serviced completely.

12. A parallel hardware-based multithreaded processor comprises:
a general purpose processor that coordinates system functions; and
a plurality of microengines that support multiple hardware threads; and
a controller for a random access memory comprising:
control logic, including an arbiter that detects a status of outstanding memory reference, to select a memory reference from one of a plurality queues, said control logic responsive to a memory reference chaining bit that when set allows for special handling of contiguous memory references, the special handling allowing the arbiter to service a same queue until the memory reference chaining bit is cleared.

13. The processor of claim 12 wherein the controller causes consecutive memory references from a thread that has the memory reference chaining bit set to form continuous byte aligned read blocks from discontinuous memory buffers.

14. The processor of claim 12 wherein the controller causes consecutive memory references from a thread that has the memory reference chaining bit set to optimize performance when consecutive data writes are to the same SDRAM page.

15. The processor of claim 12 wherein assertion of the memory reference chaining bit causes the arbiter to select a functional unit that previously requested access to a memory system.

16. A method of controlling access to a shared memory comprises:
determining if a memory reference chaining bit is asserted; and
selecting a memory reference from one of a plurality queues of memory references based on a functional unit that asserted the memory reference chaining bit and that previously requested access to a memory system.

17. The method of claim 16 wherein selecting favors chained microengine memory references over other types of memory reference requests.

18. The method of claim 17 wherein selecting services chained requests until the memory reference chaining bit is cleared.

19. The method of claim 17 wherein selecting starts by examining for chained microengine memory reference requests.

20. An apparatus comprising a machine-readable storage medium having executable instructions for controlling access to a shared memory the instructions enabling the machine to:
determines if a memory reference chaining bit is asserted; and
select a memory reference from one of a plurality queues of memory references based on a functional unit that asserted the memory reference chaining bit and that previously requested access to a memory system.

21. The apparatus of claim 20 wherein to select favors chained microengine memory references over together types of memory reference requests.

22. The apparatus of claim 20 wherein to select services chained requests until the memory reference chaining bit is cleared.

23. The apparatus of claim 20 wherein to select starts by examining for chained microengine memory reference requests.

* * * * *